(12) United States Patent
Boyer et al.

(10) Patent No.: US 10,471,285 B1
(45) Date of Patent: *Nov. 12, 2019

(54) VIDEO FLAME DETECTION SYSTEM AND METHOD FOR CONTROLLING A RANGE

(71) Applicant: STATE FARM MUTUAL AUTOMOBILE INSURANCE COMPANY, Bloomington, IL (US)

(72) Inventors: Patrick H. Boyer, Bloomington, IL (US); John Donovan, Bloomington, IL (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 565 days.

This patent is subject to a terminal disclaimer.

(21) Appl. No.: 15/253,293

(22) Filed: Aug. 31, 2016

Related U.S. Application Data

(63) Continuation of application No. 14/820,335, filed on Aug. 6, 2015, now Pat. No. 9,466,195.

(51) Int. Cl.
  *A62C 3/00* (2006.01)
  *G05B 19/048* (2006.01)
  *G08B 17/10* (2006.01)

(52) U.S. Cl.
  CPC .................. *A62C 3/006* (2013.01)

(58) Field of Classification Search
  CPC ........ G05B 19/048; G05B 2219/24152; G08B 17/10; G08B 17/125; A62C 3/006
  See application file for complete search history.

(56) References Cited

U.S. PATENT DOCUMENTS

| | | | |
|---|---|---|---|
| 8,538,080 B2 | 9/2013 | Pu et al. | |
| 2004/0004559 A1* | 1/2004 | Rast | G02B 27/017 341/34 |
| 2004/0145466 A1 | 7/2004 | Anthony et al. | |
| 2005/0266363 A1* | 12/2005 | Ganeshan | F23N 5/082 431/79 |
| 2007/0240887 A1 | 10/2007 | Howeth et al. | |
| 2010/0073174 A1 | 3/2010 | Dufour | |
| 2010/0073477 A1* | 3/2010 | Finn | G06K 9/0063 348/143 |
| 2010/0084395 A1* | 4/2010 | Gutierrez | H05B 6/062 219/667 |

(Continued)

*Primary Examiner* — Kenneth M Lo
*Assistant Examiner* — Chad G Erdman
(74) *Attorney, Agent, or Firm* — Marshall, Gerstein & Borun LLP; Randall G. Rueth

(57) ABSTRACT

A video flame detection system and method for controlling a range. The system includes a video flame detector assembly coupled to an electric range and having a camera. A relay control board is coupled to the video flame detector assembly and includes a smoke contact, a flame contact, a relay module, a processor, and a memory coupled to the processor. A range control system is coupled to the relay control board and includes a control relay. When the video flame detector assembly detects smoke, the video flame detector assembly activates the smoke contact of the relay module, causing the range control system to modulate the electric current of a heating element of the range according to at least one of a first pattern or a second pattern.

20 Claims, 5 Drawing Sheets

(56) References Cited

U.S. PATENT DOCUMENTS

2010/0244929 A1\* 9/2010 Jalbout ................ H02M 3/157
327/427
2015/0226439 A1\* 8/2015 Mikulec ............. F24C 15/2021
99/337

\* cited by examiner

VIDEO FLAME DETECTION SYSTEM AND METHOD FOR CONTROLLING A RANGE

CROSS-REFERENCE TO RELATED APPLICATIONS

The present application is a continuation of U.S. application Ser. No. 14/820,335 filed Aug. 6, 2015, entitled "Video Flame Detection System and Method for Controlling a Range," which is hereby incorporated by reference for all purposes.

FIELD OF TECHNOLOGY

The present disclosure relates generally to smoke and fire detection systems, and more particularly, to a video flame detection system and method for controlling a range.

BACKGROUND OF THE DISCLOSURE

Cooking is, and has long been, the leading cause of home structure fires and civilian home fire injuries. This is true for both fires reported to fire departments and those handled without fire department assistance. During 2006-2012, U.S. fire departments responded to an estimated average of 150,200 home structure fires involving cooking equipment per year. These fires caused an annual average of 500 civilian deaths, 4,660 civilian injuries, and $756 million in direct property damage. See, e.g., NFPA 2013. Ranges, with or without ovens, account for the majority (59%) of total reported home structure fires involving cooking equipment and even larger shares of associated civilian deaths.

Conventional smoke and fire detectors typically detect the presence of certain particles generated by smoke and fire by ionization or photometry. Weaknesses of smoke detectors include that they are distance limited, susceptible to false alarms, lose sensitivity over time, may require annual battery replacements, and fail in open or large spaces. Currently, there are no products on the market that use a smoke or fire detector to control a stove top range burner element.

SUMMARY OF THE DISCLOSURE

A video flame detection system and method for controlling a range are disclosed. In one example, the video flame detection system includes a video flame detector assembly having a camera, the video flame detector assembly to be coupled to a range. The system also includes a relay control board coupled to the video flame detector assembly, the relay control board having a smoke contact, a flame contact, and a relay module. A range control system is coupled to the relay control board and includes a processor and a control relay. When the video flame detector assembly detects smoke, the smoke contact of the relay module is activated, causing the range control system to module the electric current of a heating element of a range according to at least one of a first pattern or a second pattern.

In another example of the present disclosure, an electric range is disclosed that includes a hood, a body coupled to the hood, the body having a top surface for receiving a cooking apparatus, and at least one heating element disposed within the body and below the top surface. The range further includes a video flame detection system that is coupled to the body. The video flame detection system includes a video flame detector assembly that is coupled to one of the hood or the body and includes a camera. The video flame detection system further includes a video flame interface system coupled to the video flame detector assembly. The video flame interface system includes a relay control board with a smoke contact, a flame contact, and a relay module. A range control system is disposed within the body and coupled to the relay control board; the range control system includes a processor and a control relay. Upon detection of one or more of smoke or flames, the video flame detector assembly activates one or more of the smoke contact or the flame contact, respectively, on the relay module of the relay control board, causing the control relay of the range control system to one or more of: (1) modulate the electric current provided to the heating element according to at least one of a first pattern or a second pattern upon detection of smoke; or (2) remove all power from the heating element upon detection of one or more flames.

In yet another example of the present disclosure, a method of controlling an amount of electric current being applied to a heating element of an electric range is disclosed. The method includes detecting smoke via a video flame detector assembly, the video flame detector assembly having a camera. The method also includes activating a smoke contact on a relay module of a relay control board coupled to the video flame detector assembly via the video flame detector assembly, and modulating an electric current provided to a heating element of a range according to one or more of a first pattern or a second pattern. The first pattern occurs for a period of five minutes, and the second pattern only occurs when smoke continues to be detected after the period of five minutes. The method also includes detecting one or more flames via the video flame detector assembly and activating a flame contact on the relay module of the relay control board via the video flame detector assembly. The method still further includes removing power being applied to the heating element via the range control system upon detecting one or more flames at any time via the video flame detector assembly.

In yet another example, another video flame detection system is disclosed. The video flame detection system includes a video flame detector assembly having a camera. The video flame detector assembly is to be coupled to a range. In addition, the system includes a relay control board coupled to the video flame detector assembly, the relay control board having a flame contact and a relay module. A range control system is coupled to the relay control board and includes a control relay. Upon detection of one or more flames via the video flame detector assembly, the video flame detector assembly activates the flame contact of the relay module, causing the range control system to remove all power from a heating element of the range.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DESCRIPTION OF THE DISCLOSURE

The present disclosure is generally directed to a video flame detection system having a video flame detector assembly that is coupled to a hood of an electric range and includes a camera. The system further includes a relay control board coupled to the video flame detector assembly and having a smoke contact, a flame contact, and a relay module. A range control system disposed within the electric range is coupled to the relay control board. When the video flame detector assembly detects smoke, the video flame detector assembly activates the smoke contact of the relay module, causing the range control system to modulate the electric current of a heating element of the range according to at least one of a first or a second pattern. In addition, when the video flame detector assembly detects one or more flames, the video flame detector assembly activates at least one flame contact on the relay module, causing the control relay of the range control system to remove power from the heating element of the electric range.

Figure 1:
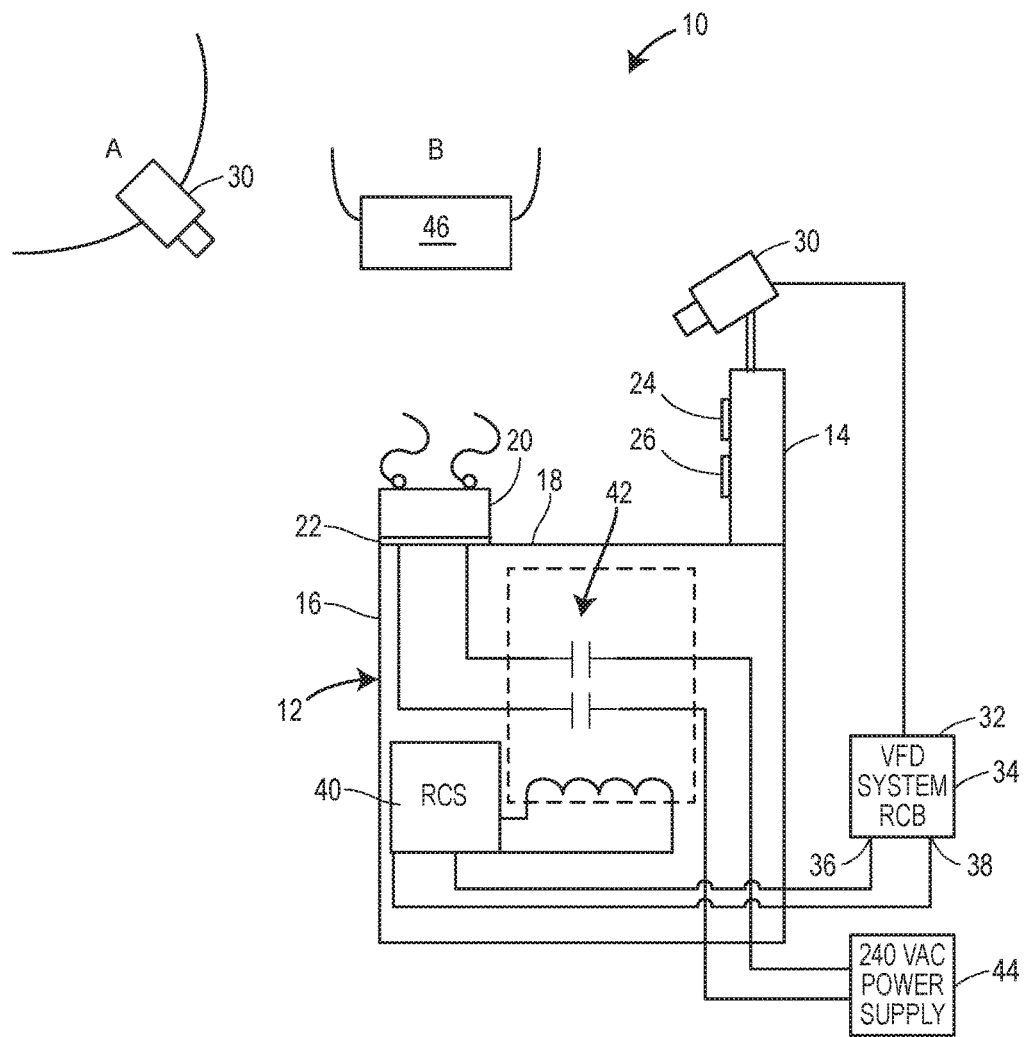
FIG. 1 is a schematic diagram of the video flame detection system of the present disclosure coupled to an electric range.

More specifically, and referring now to FIG. 1, a video flame detection system 10 for controlling a range 12 is depicted. The range 12 includes a hood 14 and a body 16 coupled to the hood 14. The body 16 has a top surface 18 for receiving a cooking apparatus 20 and at least one heating element 22 disposed within the body 16 and just below the top surface 18, in one example. In another example, the hood 14 of the range 12 may include one or more of an audio alarm 24, such as an audio signal, or a visual alarm 26, such as a visual signal or light, disposed on the hood 14, as depicted in FIG. 1. While the audio and visual alarms 24, 26 are depicted on the hood 14, one of ordinary skill in the art will appreciate that the audio and visual alarms 24, 26 may alternatively be disposed on another surface of the body 16 of the range 12 and still fall within the scope of the present disclosure. One or more of the audio or visual alarms 24, 26 may be activated by the video flame detection system 10 when one or more of smoke or flames are detected.

Still referring to FIG. 1, the video flame detection system 10 includes a video flame detector assembly 30 adapted to be coupled to or coupled to the range 12. In particular, the video flame detector assembly 30 may be physically attached to the hood 14 of the range 12 or alternatively, secured or attached to another surface A, such as a ceiling or a wall, for example, of a room or area in which the range 12 is disposed. In this example, the video flame detector assembly 30 is wirelessly and operatively connected to the range 12 and other components of the video flame detection system 10, as described more below.

The video flame detection system 10 further includes a video flame detector system interface 32 having a relay control board 34, such as a WISE-7167. The video flame detector system interface 32 is coupled to the video flame detector assembly 30 via one of a physical wired connection or a wireless connection, as one of ordinary skill in the art will understand. The relay control board 34 includes a smoke contact 36 and a flame contact 38, both of which are coupled to a range control system 40 disposed within the body 16 of the range 12. The range control system 40 includes a control relay 42. When the video flame detector assembly 30 detects smoke, the smoke contact 36 of the relay control board 24 is activated, which causes the range control system 40 to modulate electric current provided to the heating element 22 according to at least one or more of a first pattern or a second pattern, as further described below. In addition, when the video flame detector assembly 30 detects one or more flames, the flame contact 38 of the relay control board 24 is activated, which causes the range control system 40 to remove power from a power supply 44, for example, to the heating element 22.

In yet another example, when the video flame detector assembly 30 detects one or more flames, the video flame detector assembly 30 may further activate a fire suppression system 46 to extinguish the flames. In one example, the fire suppression system 46 is attached to one of a wall, an area, or a ceiling B of the room or space in which the range 12 is disposed. In another example, the fire suppression system 46 is one or more of a fire extinguisher, a sprinkler, or a water source for supplying water. As one of ordinary skill in the art will understand, the fire suppression system may additionally or alternatively include any other known fire suppression system not listed and still fall within the scope of the present disclosure. As one of ordinary skill in the art will further understand, in one example, the video flame detector assembly 30 may be wirelessly connected to the fire suppression system 46 to operate and/or control the fire suppression system 46, if/as needed.

Figure 2:
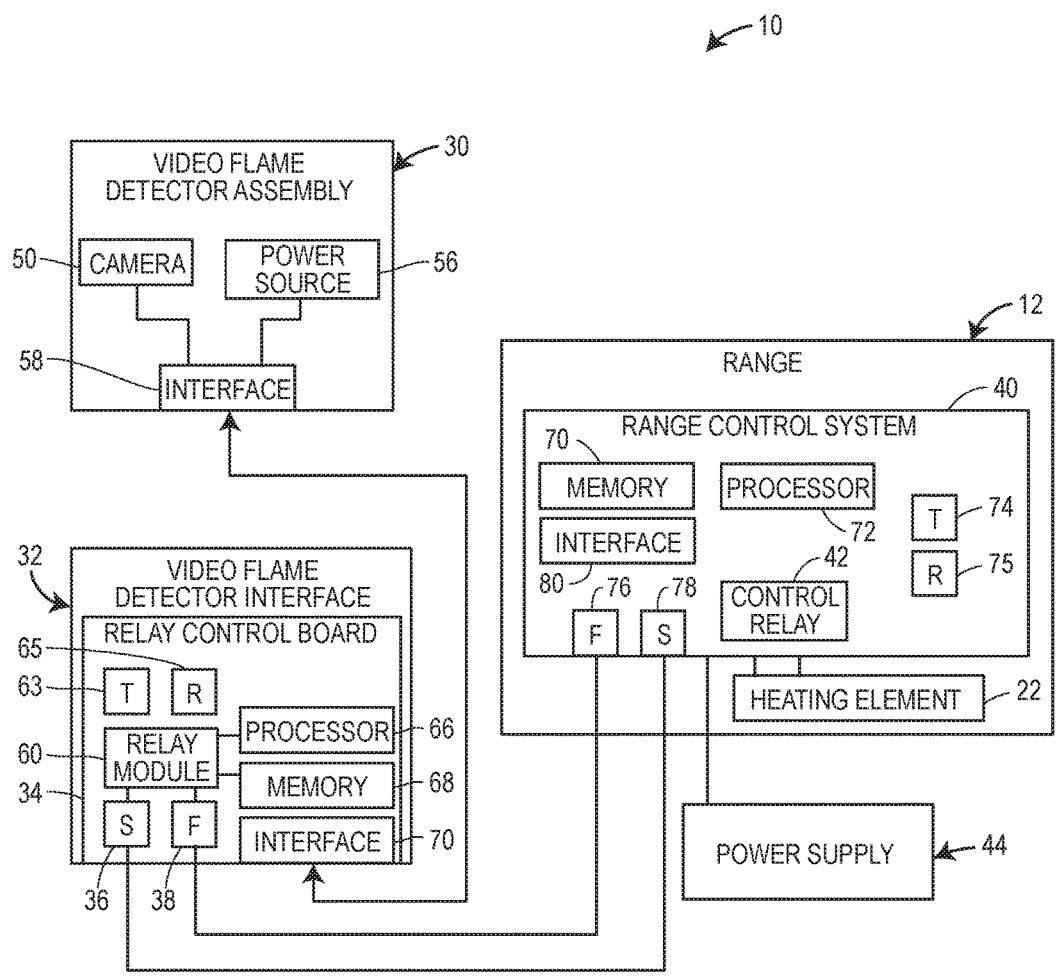
FIG. 2 is a block diagram illustrating the video flame detection system of FIG. 1.

Referring now to FIG. 2, a block diagram of the video flame detection system 10 of the present disclosure is depicted. The video flame detector assembly 30 includes a camera 50, a power source 56, and an interface 58. The interface 58 may be a network interface for connecting to a wireless network or an interface for connecting to another device via a physical wired connection, for example. As depicted again in FIG. 2, the video flame detector assembly 30 is connected to the range 12, either physically via a wired connection or wirelessly via a wireless network, for example, as one of ordinary skill in the art will appreciate.

As further depicted in FIG. 2, the video flame detector interface 32 is coupled to the video flame detector assembly 30 and includes the relay control board 34. The relay control board further includes a relay module 60, the smoke contact 36, the flame contact 38, a transmitter 63, a receiver 65, at least one processor 66, a memory 68 connected to the at least one processor 66, and an interface 70. Like the interface 58 of the video flame detector assembly 30, the interface 70 of the relay control board 34 may be a network interface that is wirelessly connected to a wireless network to provide a communication link between the video flame detector assembly 30, including the camera 50, and the relay control board 34, for example. The relay control board 34 includes digital signal processing software within the memory 68 to operate as described.

While the camera 50 may include any type of camera capable of taking video or pictures, in one example, the camera 50 may be a web camera or a camera disposed within a smart phone. In the smart phone camera example, the camera may also interface with and/or be communicatively coupled to a memory and a processor of the smart phone, for example. One of ordinary skill in the art will appreciate that the camera 50 may include this example and various other cameras capable of operating like the camera 50 and still fall within the scope of the present disclosure.

As further depicted in FIG. 2, the range control system 40 is coupled to the relay control board 34 and includes the control relay 42, a memory 70, a processor 72 connected to the memory 70, a transmitter 74, and a receiver 75. The range control system 40 further includes a flame contact 76 that corresponds to and is in communication with the flame contact 38 of the relay control board 34. In addition, the range control system 40 also includes a smoke contact 78 that corresponds to and is in communication with the smoke contact 36 of the relay control board 34. The range control system 40 still further may include an interface 80, such as a network interface, which may allow a wireless connection between the range control system 40 and one or more of the video flame detector assembly 30 and the video flame detector interface 32 having the relay control board 34.

When the camera 50 of the video flame detector assembly 30 detects smoke, the video flame detector assembly 30 sends a signal to the relay control board 34 to activate the smoke contact 36 of the relay module 60. In one example, the processor 72 of the range control system 40 one or more of senses and/or detects the activation of the smoke contacts 36, 78. This causes the control relay 42 to modulate the electric current of the heating element 22 of the range 12 according to one or more of a first pattern or a second pattern, both of which are described more below.

In addition, when the camera 50 of the video flame detector assembly 30 detects one or more flames, the video flame detector assembly 30 sends a signal to the relay control board 34 to activate the flame contact 38 of the relay module 60. In one example, the processor 72 of the range control system 40 one or more of senses and/or detects the activation of the flame contact 38 of the relay control board 34, and, thus, the flame contact 76 of the range control system 40. The control relay 42 then removes any power, such as electric current from the power source 44, for example, that is being applied or provided to the heating element 22.

Each of the interfaces 58, 70, and 80 of the video flame detector assembly 30, the relay control board 34, and the range control system 40, respectively, may be network interfaces that allow each of the video flame detector assembly 30, the relay control board 34, and the range control system 40 to be in communication with each other via a network, such as a wireless network. The network may be a single network, or may include multiple networks of one or more types (e.g., a public switched telephone network (PSTN), a cellular telephone network, a wireless local area network (WLAN), the Internet, etc.). In some examples, the network may include one or more devices such as computers, servers, routers, modems, switches, hubs, or any other networking equipment.

Figure 3:
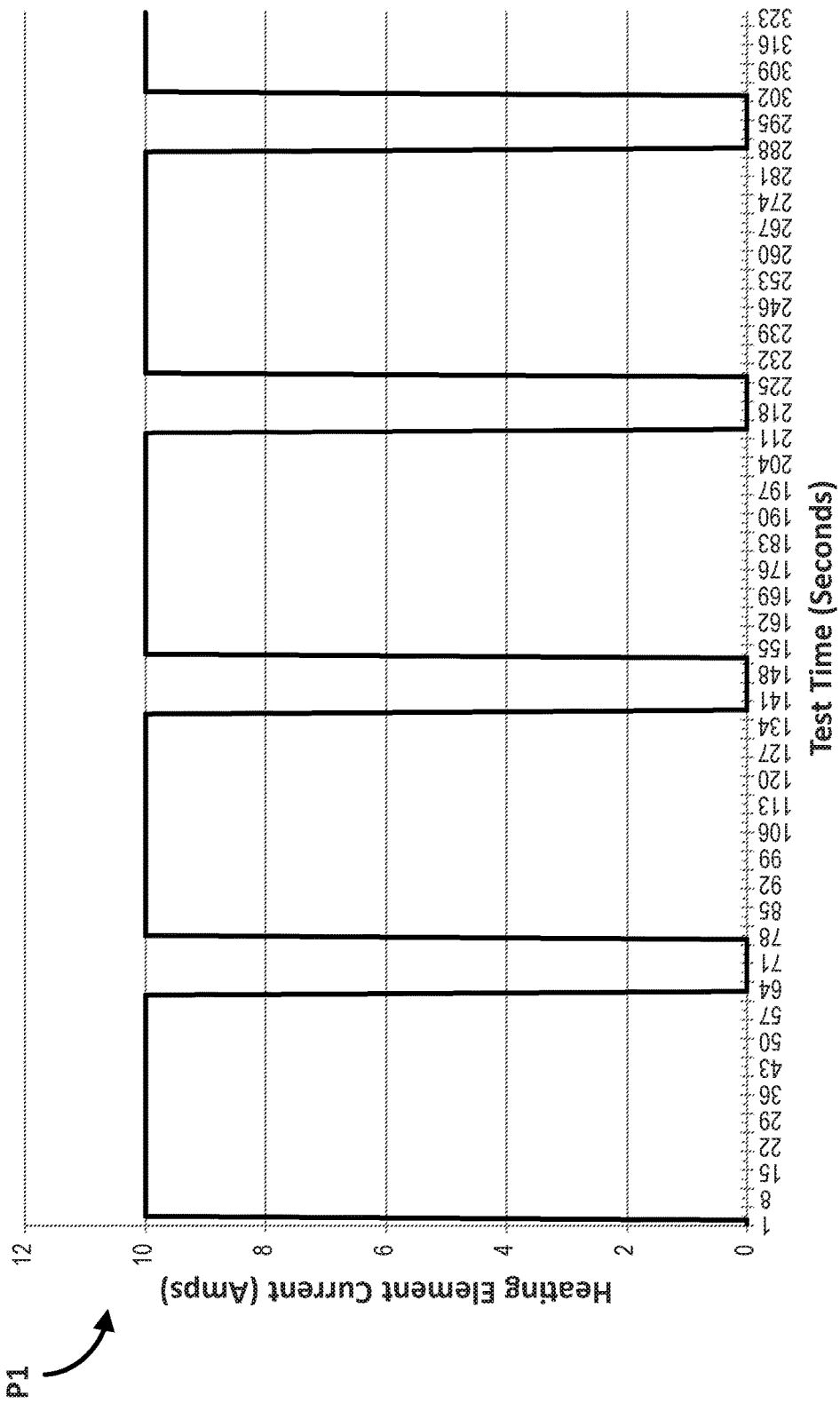
FIG. 3 is a graph depicting an exemplary first pattern of the video flame detection system of the present disclosure for modulating electric current applied to a heating element of a range.

Referring now to FIG. 3, an exemplary first pattern P1 of modulating electric current being applied to the heating element 22 is shown in graphical form when the video flame detector assembly 30 detects smoke. The first pattern P1 is applied to the heating element 22 for a period of five minutes. One example of the first pattern P1 includes applying the electric current to the heating element 22 for approximately 60 seconds and then removing the electric current applied to the heating element for approximately 15 seconds, the first pattern continuing for a period of five minutes. Another example of the first pattern P1 includes applying electric current to the heating element 22 for a first period of time T1 and then removing the electric current applied to the heating element 22 for a second period of time T2. In that example, the second period of time T2 is equal to one fourth of the first period of time T1. Said another way, the second period of time T2=T1/4. Thus, as another example, the first pattern P1 may include applying the electric current to the heating element 22 for 50 seconds and then removing the electric current to the heating element 22 for a second period of time of 12.5 seconds. In another example, the first pattern P1 may include applying the electric current to the heating element for a first period of time of 75 seconds and then removing the electric current to the heating element 22 for a second period of time of 18.75 seconds. In other words, in the first pattern P1, the first period of time T1 in which the electric current is applied to the heating element 22 is greater than the second period of time T2 in which the electric current is removed from the heating element 22. In all examples, the first pattern P1 having a first period of time T1 followed by a second period of time T2 occurs for a third period of time T3 of five minutes.

Figure 4:
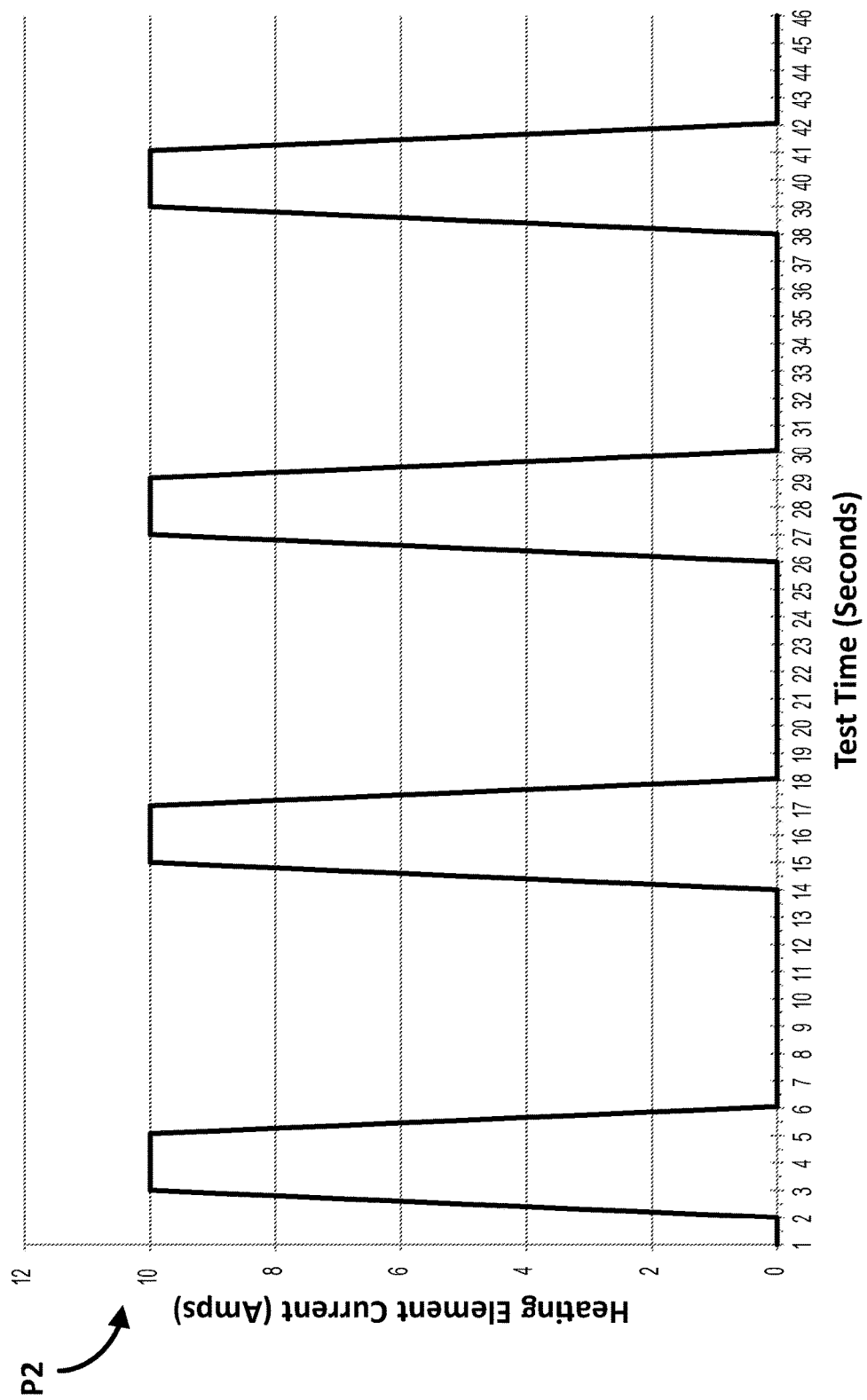
FIG. 4 is another graph depicting an exemplary second pattern of the video flame detection system of the present disclosure for modulating electric current applied to the heating element of the range.

Referring now to FIG. 4, an exemplary second pattern P2 of modulating electric current being provided to the heating element 22 is depicted when the first pattern P1 is applied for five minutes and the video flame detection assembly 30 still detects smoke. In one example, the second pattern P2 includes applying the electric current to the heating element for 4 seconds and removing the electric current to the heating element for 8 seconds when smoke continues to be detected after the period of five minutes for the first pattern P1. Another example of the first pattern P1 includes applying electric current to the heating element 22 for a fourth period of time T4 and then removing the electric current applied to the heating element for a fifth period of time T5. In one example, the fourth period of time T4 is equal to one half of the fifth period of time T5. Said another way, the fifth period of time T5=(T4×2) or the fourth period of time T4=T5/2. In other words, the fourth period of time T4 in which the electric current is applied to the heating element 22 is less than the fifth period of time T5 in which the electric current is removed from the heating element 22.

Figure 5:
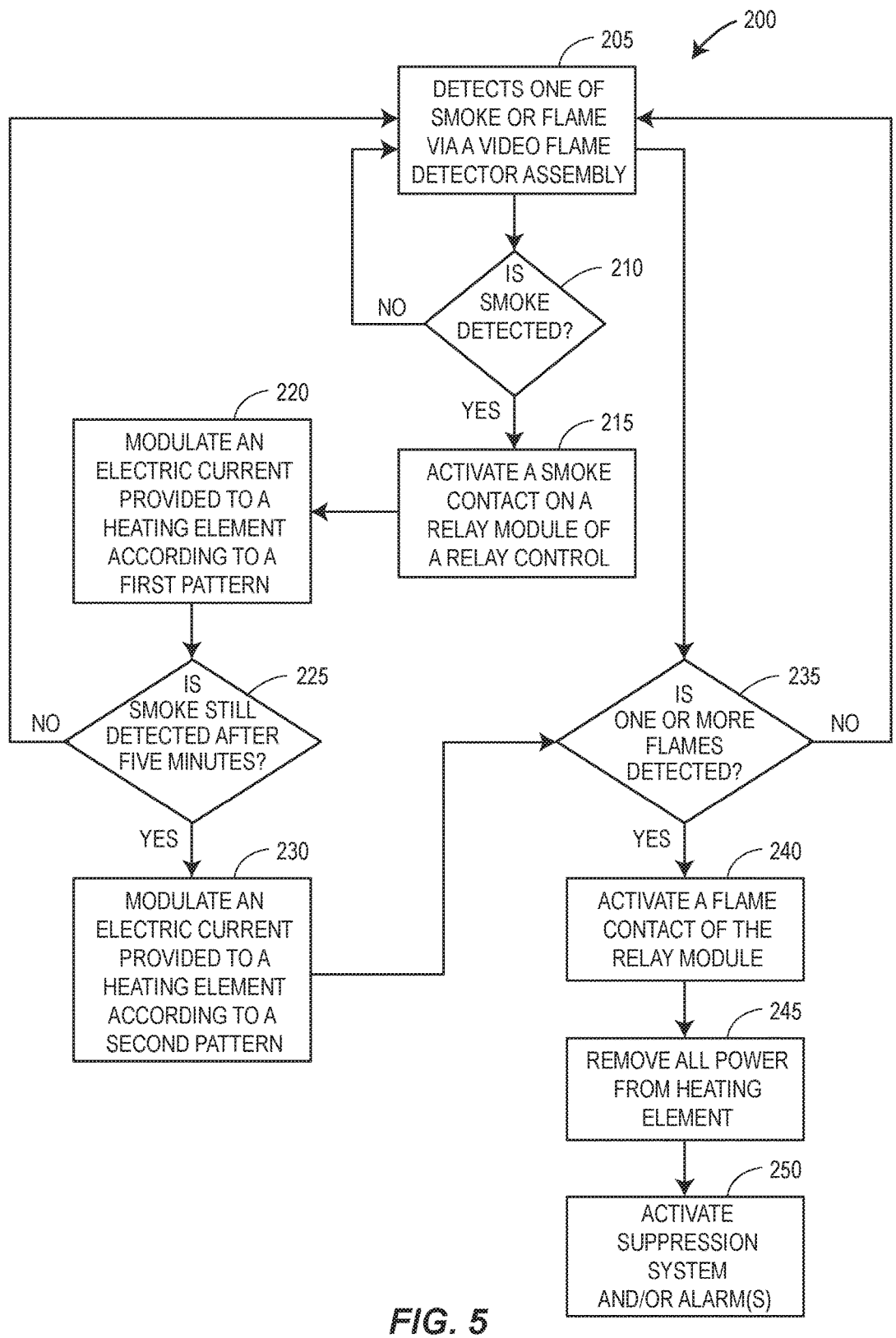
FIG. 5 is a flow chart illustrating a method of controlling an amount of electric current being applied to a range via the video flame detection system of the present disclosure.

Referring now to FIG. 5, a flow chart of an exemplary method 200 of controlling an amount of electric current being applied to the heating element 22 of the electric range 12 is depicted. The method 200 may be implemented, in whole or in part, on one or more devices or systems such as those shown in the video flame detection system 10 of FIGS. 1 and 2. The method 200 may be saved as a set of instructions, routines, programs, or modules on memory such as the memory 68 of FIG. 2, and may be executed by one or more processors, such as one or more of the processors 66, 72 of FIG. 2.

The method 200 begins when the video flame detector assembly 30 monitors, e.g., via the camera 50, the range 12 (FIG. 1) to detect one or more of smoke or flames at block 205. At block 210, the camera 50 of the video flame detector assembly 30 determines if smoke is detected, for example. If smoke is not detected, the video flame detector assembly 30 operates under normal conditions, continuing to monitor the top surface 18 of the range 12 (FIG. 1) to detect one or more of smoke or flames in block 205.

If, however, smoke is detected by the camera 50, for example, the smoke contact 36 of the relay module 60 of the relay control board 34 (FIG. 2) is activated in block 215. In one example, the processor 66 activates the smoke contact 36 of the relay module 60.

In block 220, the relay control board 34 instructs the control relay 42 of the range control system 40 to modulate an electric current provided to the heating element 22 according to a first pattern P1. More specifically, the processor 72, for example, of the range control system 40 senses and/or detects the activation of the smoke contact 36, which causes the control relay 42 of the range control system 40 to modulate the electric current provided to the heating element. As discussed relative to FIG. 3, the first pattern P1 may include applying the electric current to the heating element 22 for a first period of time T1 of 60 seconds and then removing or turning "off" the electric current applied to the heating element 22 for a second period of time T2 of 15 seconds. This on/off first modulation pattern P1 occurs for a period of five minutes.

In block 225, the video flame detector assembly 30 then determines whether smoke is still detected after the first pattern P1 of electric current modulation occurs for the five minute period. If smoke is not detected, the video flame detector assembly 30 continues to monitor the range 12 to detect one of smoke or flames in block 205. If, however, smoke is still detected, the video flame detector assembly 30 activates the smoke contact 36 of the relay control board 34, which is detected by the range control system 40. This causes the range control system 40 to modulate the electric current provided to the heating element 22 according to a second pattern P2 in block 230.

More specifically, in block 230, the video flame detector assembly 30 again activates the smoke contact 36 of the relay module 60 of the relay control board 34 upon still detecting smoke after the first pattern P1 of modulating the electric current to the heating element 22 occurs for a period of five minutes. The processor 72 again one or more of detects and/or senses the activation of the smoke contact 36, which causes the range control system 40 to modulate the electric current applied to the heating element 22 of the range 12 according to the second pattern P2 for a predetermined period of time. In one example, the second pattern P2 includes applying electric current to the heating element 22 or having the heating element 22 "on" for 4 seconds and removing electric current or heat from or turning "off" the heating element 22 for 8 seconds repeatedly for the predetermined period of time.

In block 235, the video flame detection assembly 30, via the camera 50, for example, then determines whether one or more flames are detected. If one or more flames are not detected, the video flame detector assembly 30 continues to monitor the range 12 to detect one or more of smoke or flames in block 205.

If, however, one or more flames are detected, the video flame detector assembly 30 activates the flame contact 38 of the relay module 60 of the relay control board in block 240. The control relay 42 of the range control system 40 then removes all power, e.g., electric current, being applied to the heating element 22 in block 245. More specifically, and in one example, the processor 72 of the range control system 40 senses activation of the flame contact 38 of the relay module 60 of the relay control board 34, which causes the range control system 40 to turn off, e.g., remove, all power being directed to the heating element 22 of the range 12.

In one example, the fire suppression system 46 (FIG. 1) of the video flame detection system 10 may be activated in block 250 when one or more flames are detected. More specifically, upon detecting one or more flames, the video flame detector assembly 30 may also activate the fire suppression system 46 and/or one or more audio or visual alarms 24, 26 (FIG. 1). In this way, damage from the one or more flames is minimized by the fire suppression system 46, and a user may be alerted by the one or more audio or visual alarms 24, 26.

One of ordinary skill in the art will appreciate that various additions and/or modifications may be made to the systems and methods described above without departing from the scope of the present disclosure. For example, although one camera 50 is depicted in the figures as part of the video flame detector assembly, more than one camera 50 and/or multiple cameras may be used, including a web camera or a smart phone camera, provided each of the cameras has the necessary software for detecting one or more of smoke or flames, for example. In addition, each of the one or more cameras and types of cameras that may be used with the systems and methods of the present disclosure needs to have a clear view of the range or stove, for example, to operate properly.

In addition, while not depicted in any of the figures, the video flame detection system may alternatively include one or more modules and/or software that enable detection of water in an area or a surface being monitored by the camera 50, for example. Moreover, the video flame detection system may further interact with another remote system via a wireless network or radio frequency, for example, to alert a user via text or any other type of communication that one or more of smoke or flames have been detected.

Overall, one of ordinary skill in the art will appreciate the advantages of the video flame detection system 10 and method 200 of the present disclosure. For example, using video, e.g., the camera 50, enables the video fire detection system 10 to serve both large and small spaces. Thus, the video fire detection system 10 can be tailored, in particular, to a stove top or a top surface of the range 22. In addition, the video flame detection system 10 is not susceptible to sensitivity loss, like known smoke detectors, for example. Moreover, the video flame detection system 10 does not require batteries and is always on, eliminating the risk of failing or dead batteries in using conventional smoke detectors.

Further, unlike any known smoke or fire detectors, the video flame detection system 10 of the present disclosure regulates the heat output of the heating element 22 of the range 12 when smoke is detected and shuts off all power being applied to the heating element 22 upon detection of any flames. As a result, the video flame detection system 10 also reduces the risk of home fires involving cooking equipment, such as the cooking apparatus 20 disposed on the range 12, and even larger shares of associated civilian deaths resulting from such fires.

Still further, the video flame detection system 10 and method 200 are also able to detect a potential fire before human eye detects the fire. More specifically, one or more modules of the video flame detection system are able to detect a flame and/or spotty patches of smoke that conventional smoke detectors may not always detect.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

Upon reading this disclosure, those of skill in the art will appreciate still additional alternative structural and functional designs for a video flame detection system and method for controlling an electric range through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A video flame detection system comprising:
a video flame detector assembly having a camera, the video flame detector assembly to be coupled to a range; and
a relay control board coupled to the video flame detector assembly, the relay control board having a smoke contact, a flame contact, and a relay module;
where, upon detection of smoke via the video flame detector assembly, the video flame detector assembly is configured to activate the smoke contact of the relay module, causing a range control system to modulate an electric current of a heating element of a range according to at least one of a first pattern or a second pattern,
where the first pattern includes applying the electric current to the heating element and then removing the electric current applied to the heating element, the first pattern continuing for a period of time, where a period of time in which the electric current is applied to the heating element is greater than a period of time in which the electric current is removed from the heating element, and
where the second pattern includes applying the electric current to the heating element and then removing the electric current to the heating element when smoke continues to be detected, where a period of time in which the electric current is applied to the heating element is less than a period of time in which the electric current is removed from the heating element.

2. The system of claim 1, wherein the first pattern includes applying the electric current to the heating element for 60 seconds and then removing the electric current to the heating element for 15 seconds, the first pattern continuing for a period of five minutes.

3. The system of claim 2, wherein the second pattern includes applying the electric current to the heating element for 4 seconds and removing the electric current to the heating element for 8 seconds when smoke continues to be detected after the period of five minutes.

4. The system of claim 1, where the first pattern includes applying the electric current to the heating element for a first period of time T1 and then removing the electric current applied to the heating element for a second period of time T2, the first pattern continuing for a third period of time T3, wherein the first period of time T1 is greater than the second period of time T2.

5. The system of claim 4, wherein the second pattern includes applying the electric current to the heating element for a fourth period of time T4 and removing the electric current to the heating element for a fifth period of time T5 when smoke continues to be detected after the period of five minutes, wherein the fourth period of time T4 is less than the fifth period of time T5.

6. The system of claim 1, wherein all power is removed from the heating element of the range when the video flame detector assembly detects one or more flames at any time.

7. The system of claim 6, wherein when the video flame detector assembly detects one or more flames, the video flame detector assembly activates a fire suppression system to extinguish the flames.

8. The system of claim 1, wherein the video flame detector assembly is one or more of physically connected to a surface of the range, physically connected to a hood of the range, or wirelessly coupled to the range.

9. An electric range comprising:
a hood, a body coupled to the hood, the body having a top surface for receiving a cooking apparatus, and at least one heating element disposed within the body and below the top surface;
a video flame detection system coupled to the body, the video flame detection system comprising:
a video flame detector assembly having a camera, the video flame detector assembly coupled to one of the hood or the body;
a video flame detector system interface coupled to the video flame detector assembly, the video flame detector system interface having a relay control board with a smoke contact, a flame contact, a relay module, and a processor;
a range control system disposed within the body and coupled to the relay control board, the range control system having a control relay;
where, upon detection of one or more of smoke or flames, the video flame detector assembly activates one or more of the smoke contact or the flame contact, respectively, on the relay module of the relay control board, causing the control relay of the range control system to one or more of: (1) modulate the electric current provided to the heating element according to at least one of a first pattern or a second pattern when smoke is detected, the first pattern including applying the electric current to the heating element and then removing the electric current applied to the heating element, the first pattern continuing for a period of time, where a period of time the electric current is applied to the heating element is greater than a period of time the electric current is removed from the heating element; and/or (2) remove all power from the heating element when one or more flames are detected,
where, upon detection of smoke and when smoke continues to be detected, the smoke contact is activated causing the control relay of the range control system to modulate the electric current to the heating element according to the second pattern, the second pattern including applying the electric current to the heating element and then removing the electric current applied to the heating element, where a period of time in which the electric current is applied to the heating element is less than a period of time in which the electric current is removed from the heating element.

10. The electric range of claim 9, where the video flame detector assembly is one of physically attached or wirelessly connected to one of the hood or body.

11. The electric range of claim 9, wherein, upon detection of smoke, the smoke contact is activated causing the control relay of the range control system to modulate the electric current to the heating element according to the first pattern, the first pattern including applying the electric current to the heating element for a first period of time T1 and removing the electric current applied to the heating element for a second period of time T2, the first period of time T1 being greater than the second period of time T2.

12. The electric range of claim 11, wherein, when smoke continues to be detected after a third period of time, the smoke contact is activated causing the control relay of the range control system to modulate the electric current to the heating element according to a second pattern, the second pattern including applying the electric current to the heating element for a fourth period of time T4 and removing the electric current from the heating element for a fifth period of time T5, wherein the fourth period of time T4 is less than the fifth period of time T5.

13. The electric range of claim 9, the range further comprising at least one or more of an audio signal or a visual signal to alert a user of one or more of smoke or flames being detected by the video flame detector assembly, the one or more of the audio signal or the visual signal disposed on one or more of the hood or the body.

14. The electric range of claim 9, wherein, when flames are detected, the video flame detector assembly activates at least one flame contact causing the control relay of the relay control system to remove power from the at least one heating element.

15. A method of controlling an amount of electric current being applied to a heating element of a range, the method comprising:
detecting smoke via a camera of a video flame detector assembly;
activating, via the video flame detector assembly, a smoke contact on a relay module of a relay control board coupled to the video flame detector assembly;
modulating the electric current provided to the heating element according to one or more of a first pattern or a second pattern, the first pattern occurring for a period of time, and the second pattern occurring only when smoke continues to be detected after the period of time of the first pattern;
detecting one or more flames via the camera of the video flame detector assembly;
activating, via the video flame detector assembly, a flame contact on the relay module of the relay control board; and
removing power being applied to the heating element via a range control system upon detecting one or more flames at any time via the video flame detector assembly,
where modulating the electric current provided to the heating element according to the first pattern comprises applying electric current to the heating element and removing electric current to the heating element, the first pattern continuing for a period of time when the smoke is detected, wherein a period of time the electric current is applied is greater than a period of time the electric current is removed,
where, when smoke continues to be detected by the video flame detector assembly after the period of time of the first pattern, modulating the electric current provided to the heating element according to the second pattern includes applying electric current to the heating element and then removing the electric current to the heating element, where a period of time in which the electric current is applied to the heating element is less than a period of time in which the electric current is removed from the heating element.

16. The method of claim 15, wherein modulating the electric current provided to the heating element according to the first pattern comprises applying electric current to the heating element for a first period of time T1 and removing electric current to the heating element for a second period of time of T2, the period of time of the first pattern is five minutes, wherein the first period of time T1 is greater than the second period of time T2.

17. The method of claim 16, wherein, when smoke continues to be detected by the video flame detector assembly after the period of time of the first pattern, modulating the electric current provided to the heating element according to the second pattern comprises applying electric current to the heating element for a fourth period of time T4 and then removing electric current provided to the heating element for a fifth period of time T5, the fourth period of time T4 is less than the fifth period of time T5.

18. The method of claim 15, further comprising sensing, via one or more processors, one or more of the smoke contact or the flame contact is activated, causing the range control system to one or more of modulate the electric current applied to the heating element of the range when the smoke contact is activated or remove all power applied to the heating element of the range when the flame contact is activated.

19. A video flame detection system comprising:
a video flame detector assembly having a camera, the video flame detector assembly adapted to be coupled to a range; and
a relay control board coupled to the video flame detector assembly, the relay control board having a flame contact and a relay module;
wherein, upon detection of smoke, the video flame detector assembly activates a smoke contact to cause a range control system to modulate an electric current to a heating element according to a first pattern or a second pattern, the first pattern including applying the electric current to the heating element for a first period of time T1 and removing the electric current applied to the heating element for a second period of time T2, the first pattern continuing for a third period of time T3, the first period of time T1 being greater than the second period of time T2, and
where the second pattern includes applying the electric current to the heating element and then removing the electric current to the heating element when smoke continues to be detected, where a period of time in which the electric current is applied to the heating element is less than a period of time in which the electric current is removed from the heating element, and
where, upon detection of one or more flames via the video flame detector assembly, the video flame detector assembly is configured to activate the flame contact, causing the range control system to remove all power from the heating element of the range.

20. The video flame detection system of claim 19, further comprising a fire suppression system activated by the video flame detector assembly when flames are detected.

* * * * *